(12) United States Patent
Lee

(10) Patent No.: US 11,697,328 B2
(45) Date of Patent: Jul. 11, 2023

(54) DOOR CURTAIN ASSEMBLY HAVING SUB-CURTAIN UNIT

(71) Applicants: Hyundai Motor Company, Seoul (KR); Kia Motors Corporation, Seoul (KR)

(72) Inventor: Jae-Seung Lee, Gyeonggi do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 239 days.

(21) Appl. No.: 16/907,883

(22) Filed: Jun. 22, 2020

(65) Prior Publication Data

US 2021/0245583 A1 Aug. 12, 2021

(30) Foreign Application Priority Data

Feb. 7, 2020 (KR) .................. 10-2020-0014992

(51) Int. Cl.
*B60J 1/20* (2006.01)

(52) U.S. Cl.
CPC ............. *B60J 1/2044* (2013.01); *B60J 1/205* (2013.01); *B60J 1/2011* (2013.01); *B60J 1/2038* (2013.01); *B60J 1/2041* (2013.01); *B60J 1/2047* (2013.01); *B60J 1/2052* (2013.01); *B60J 1/2063* (2013.01); *B60J 1/2069* (2013.01); *B60J 1/2086* (2013.01)

(58) Field of Classification Search
CPC ...... B60J 1/2038; B60J 1/2044; B60J 1/2047; B60J 1/2052; B60J 1/2055; B60J 1/2063; B60J 1/2069; B60J 1/2072; B60J 1/2083

USPC ................. 296/141, 152, 142, 97.8
See application file for complete search history.

(56) References Cited

U.S. PATENT DOCUMENTS

| | | | | |
|---|---|---|---|---|
| 8,061,757 B1* | 11/2011 | Moore | ............. | B60J 1/2019 |
| | | | | 296/97.4 |
| 2010/0013262 A1* | 1/2010 | Shu | ............. | B60J 1/2077 |
| | | | | 296/97.8 |
| 2012/0298316 A1* | 11/2012 | Hirano | ............. | B60J 1/2044 |
| | | | | 160/90 |
| 2013/0255892 A1* | 10/2013 | Ojima | ............. | B60J 1/2055 |
| | | | | 160/266 |
| 2017/0297417 A1* | 10/2017 | Maier | ............. | B60J 3/02 |

(Continued)

FOREIGN PATENT DOCUMENTS

| | | | | |
|---|---|---|---|---|
| DE | 10245901 A1 * | 4/2004 | ............ | B60J 1/2022 |
| DE | 102007011270 A1 * | 7/2008 | ............ | B60J 1/2072 |
| EP | 2060421 A1 * | 5/2009 | ............ | B60J 1/2027 |

(Continued)

*Primary Examiner* — Dennis H Pedder
*Assistant Examiner* — Kevin P Weldon
(74) *Attorney, Agent, or Firm* — Fox Rothschild LLP

(57) ABSTRACT

A door curtain assembly having a sub-curtain unit is provided and includes a main fabric that is wound in a trim of a vehicle door; and a main shade bar that is installed in an upper end of the main fabric and fixed to a hook provided in the door when the main fabric is deployed. A sub-curtain part is additionally deployed after the main curtain part is deployed. The sub-curtain part includes a sub-housing having a first side hinge-coupled to the door and a second side interlocked with ascending or descending of the main shade bar. Additionally, a sub-fabric is wound in the sub-housing and a sub-shade bar is installed in an end portion of the sub-fabric in a length direction of the sub-housing.

14 Claims, 15 Drawing Sheets

(56) References Cited

U.S. PATENT DOCUMENTS

2018/0297452 A1* 10/2018 Hintennach ............ B60J 1/2069

FOREIGN PATENT DOCUMENTS

| | | | | |
|---|---|---|---|---|
| EP | 2529963 A1 | * | 12/2012 | ............ B60J 1/2033 |
| KR | 2015-0019470 A | | 2/2015 | |
| WO | WO-2013133066 A1 | * | 9/2013 | ............ B60J 1/2027 |

* cited by examiner

DOOR CURTAIN ASSEMBLY HAVING SUB-CURTAIN UNIT

CROSS-REFERENCE(S) TO RELATED APPLICATIONS

This application claims priority to Korean Patent Application No. 10-2020-0014992, filed on Feb. 7, 2020, which is incorporated herein by reference in its entirety.

BACKGROUND

Field of Present Disclosure

The present disclosure relates to a door curtain installed on a vehicle door and that controls lighting and block exposure of an interior of the vehicle, and more particularly, to a door curtain assembly having a sub-curtain which is additionally deployed after a main curtain is deployed to maximize an occlusion amount.

Description of Related Art

A door curtain assembly is typically installed in a vehicle door to control or adjust lighting by blocking some of sunlight introduced into an interior of the vehicle or to prevent the interior of the vehicle from being seen from the outside of the vehicle. FIG. 1 illustrates a state in which a door curtain assembly according to the prior art is installed in a door 100 and deployed.

As shown in FIG. 1, a door curtain includes a fabric 122 wound in a door trim 112, a shade bar 124 installed at an upper end of the fabric 122, and a knob 125 installed in the shade bar 124. A user deploys the fabric 122 upward using the knob 125 and then fixes and catches the shade bar 124 on a hook 113 installed in the door 100, thereby adjusting lighting or blocking exposure of the interior of the vehicle.

However, some regions may not be occluded or blocked by the fabric 122 according to a shape of a door glass or a shape of the door. For example, in a sliding type door 100 applied to a van, due to a shape characteristic of the sliding type door 100, some region (shown as Area A) is not occluded by the fabric 122 due to a shape of the door trim 112 installed in the door 100.

SUMMARY

An exemplary embodiment of the present disclosure is directed to a door curtain assembly having a sub-curtain which is additionally deployed when a main curtain is deployed to occlude an entirety of a door glass. Other objects and advantages of the present disclosure may be understood by the following description and become apparent with reference to the embodiments of the present disclosure. Also, it is obvious to those skilled in the art to which the present disclosure pertains that the objects and advantages of the present disclosure may be realized by the means as claimed and combinations thereof.

In accordance with an exemplary embodiment of the present disclosure, a door curtain assembly having a sub-curtain unit may include a main fabric wound in a trim of a vehicle door, a main shade bar installed in an upper end of the main fabric and fixed to a hook provided in the door when the main fabric is deployed, and a sub-curtain part configured to be additionally deployed after the main curtain part is deployed. The sub-curtain part may include a sub-housing having a first side hinge-coupled to the door, and a second side interlocked with ascending or descending of the main shade bar, a sub-fabric wound in the sub-housing, and a sub-shade bar installed in an end portion of the sub-fabric in a length direction of the sub-housing.

A rail may be disposed below the main shade bar and parallel thereto and integrally ascend or descend with the main shade bar, a sliding block may be slidably installed in the rail, and a front end of the sub-housing may be connected to the sliding block to interlock the sub-housing with the ascending or descending of the main shade bar. The sliding block may be connected to the front end of the sub-housing through a connection link, and both ends of the connection link may be hinge-coupled to the sliding block and the sub-housing, respectively.

One side of the sub-housing may be hinge-coupled to a rotating shaft that protrudes from either the trim or a main housing in which the main fabric is accommodated. The rail may be formed to a predetermined length from one side of the main shade bar. A front end of the rail may be disposed behind a main knob installed in the main shade bar for the ascending or descending operation of the main shade bar.

The sub-fabric may be elastically supported to be wound in the sub-housing. Additionally, a sub-knob may be disposed at one side of the sub-shade bar and operated when the sub-fabric is deployed. A catch part may be formed in the sub-knob and fixed and caught on one side of the trim of the door when the sub-fabric is deployed.

Further, a slit on which the catch part passes to be caught when the sub-fabric is deployed may be formed in the trim. A hook to which the sub-shade bar is caught and fixed may be installed in the trim. The sub-curtain part may be disposed further inward to an interior of a vehicle than the main fabric. The sub-housing may be disposed further inward to the interior of the vehicle than the main fabric in the main housing in which the main fabric is accommodated. The sub-curtain part may be deployed to a rear side of a vehicle.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
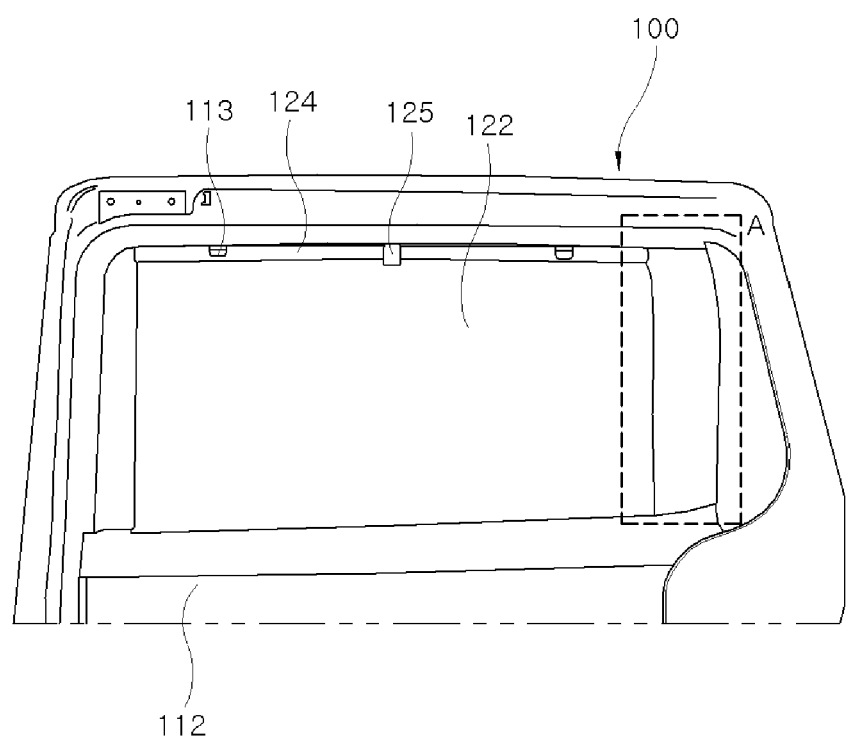
FIG. 1 is a front view illustrating an interior of a door to which a door curtain according to the prior art is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a door curtain assembly having a sub-curtain according to the present disclosure will be described in detail with reference to the accompanying drawings. The door curtain assembly having a sub-curtain according to the present disclosure may include a main fabric 22 wound in a trim 12 of a vehicle door 1, and a main curtain part 20 having a main shade bar 24 installed in an upper portion of the main fabric 22 and fixed to a hook 13 provided in a door 1 when the main fabric 22 is deployed. The door curtain assembly may include a sub-curtain part 30 after the main curtain part 20 is deployed, and the sub-curtain part 30 may include a first side hinge-connected to the door 1 and a second side connected to a sub-housing 31 interlocked with the ascending or descending of the main shade bar 24, a sub-fabric 32 wound in the sub-housing 31, and a sub-shade bar 34 installed in an end portion of the sub-fabric 32 in a length direction of the sub-housing 31.

The main curtain part 20 basically has the same structure as a typical door curtain. The main curtain part 20 may be installed in the trim 12 of the door 1. In other words, the main curtain part 20 includes a main housing 21 installed in the trim 12 and partially exposed to the trim 12, the main fabric 22 wound in the main housing 21, a main shade bar 24 installed in an upper portion of the main fabric 22, and a main knob 25 used to deploy the main fabric 22.

The main housing 21 may be disposed in the trim 12 of the door 1 to install the main curtain part 20 in the trim 12. The main housing 21 may be formed at the upper end of the trim 12 of the door 1 in a length direction of the vehicle. The main fabric 22 may be accommodated in the main housing 21 in a state of being wound. The main fabric 22 may be elastically supported in a direction of being wound around the main housing 21 and thus, when the main curtain part 20 is not used, the main fabric 22 may be accommodated in the main housing 21. The main fabric 22 may be installed to be wound around a main shaft 23 installed in the main housing 21 and the main shaft 23 may be elastically supported in a direction of winding the main fabric 22 due to a spring to elastically support the main fabric 22 to be wound around the main shaft 23

Further, the main shade bar 24 may be installed at the upper end of the main fabric 22. The main shade bar 24 simultaneously allows the upper end of the main fabric 22 to ascend. The main knob 25 may be installed on one side of the main shade bar 24 to allow a user to hold and operate the main knob 25 when the main fabric 22 is deployed or accommodated. An aperture may be formed in the main shade bar 24 to be caught to the hook 13 installed in a frame 11 of the door 1 to allow a user to pull out the main fabric 22 and catch and fix the main shade bar 24 to the hook 13. Accordingly, a glass of the door 1 may be occluded by the main curtain part 20.

Figure 2:
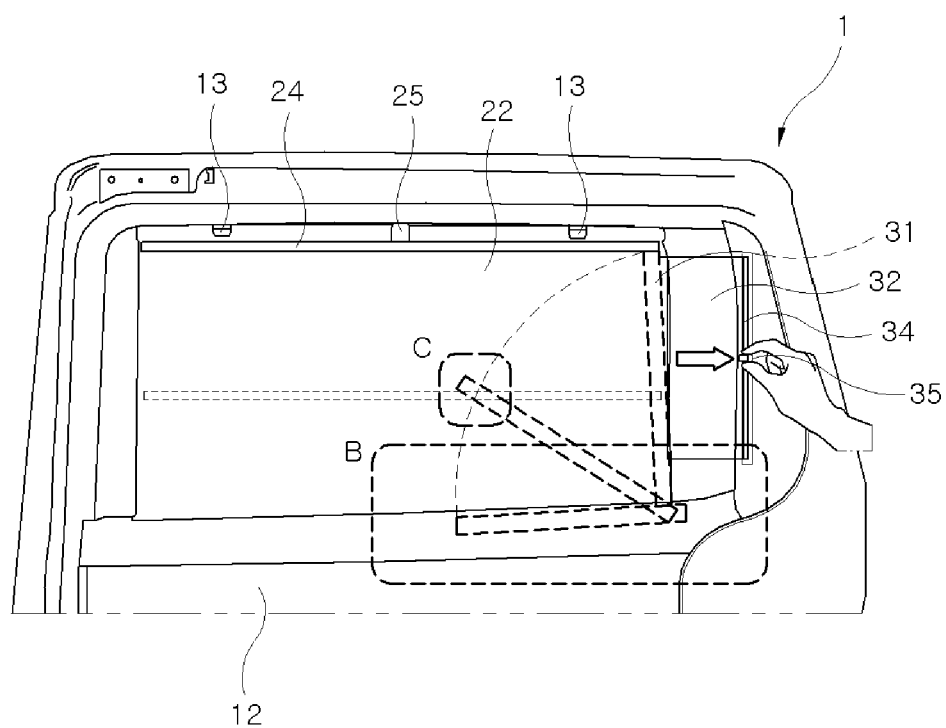
FIG. 2 is a front view illustrating an interior of a door to which a door curtain assembly having a sub-curtain according to an exemplary embodiment of the present disclosure is applied.
Figure 3:
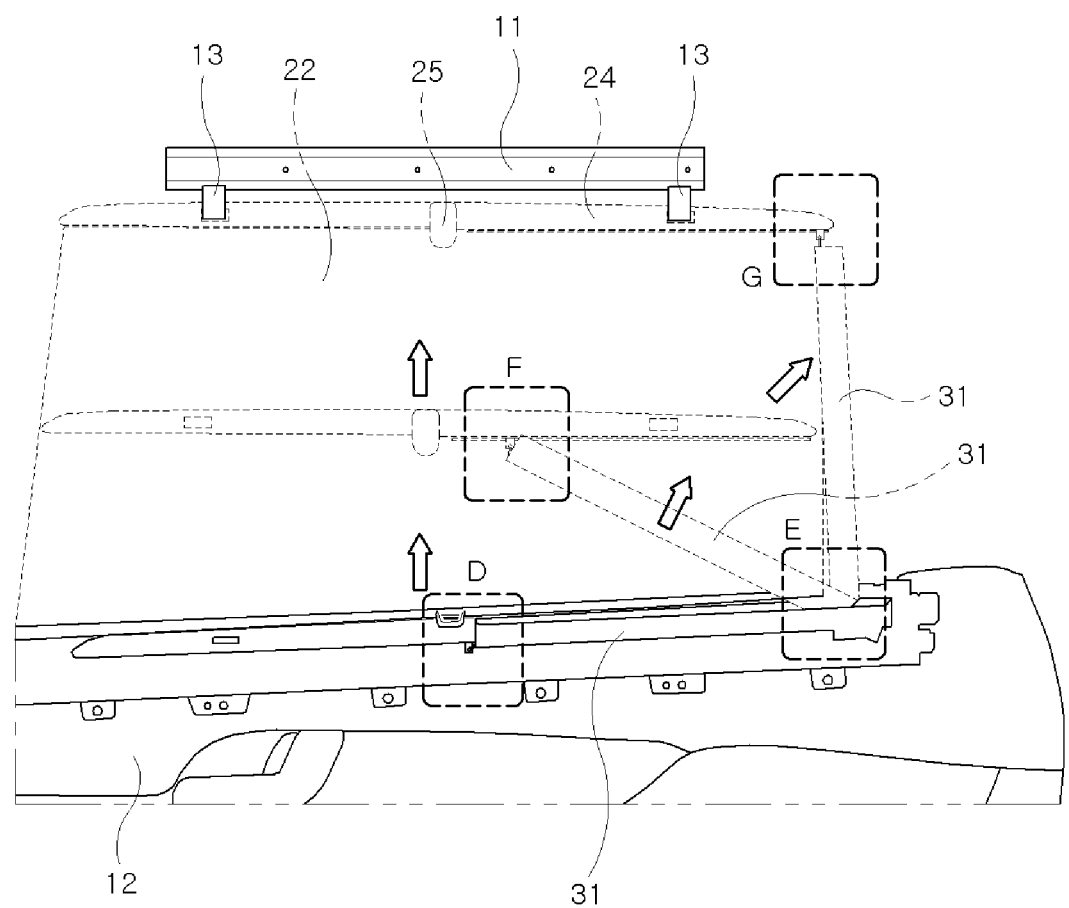
FIG. 3 is a schematic diagram illustrating an operating process of the door curtain assembly having a sub-curtain according to an exemplary embodiment of the present disclosure.
Figure 4:
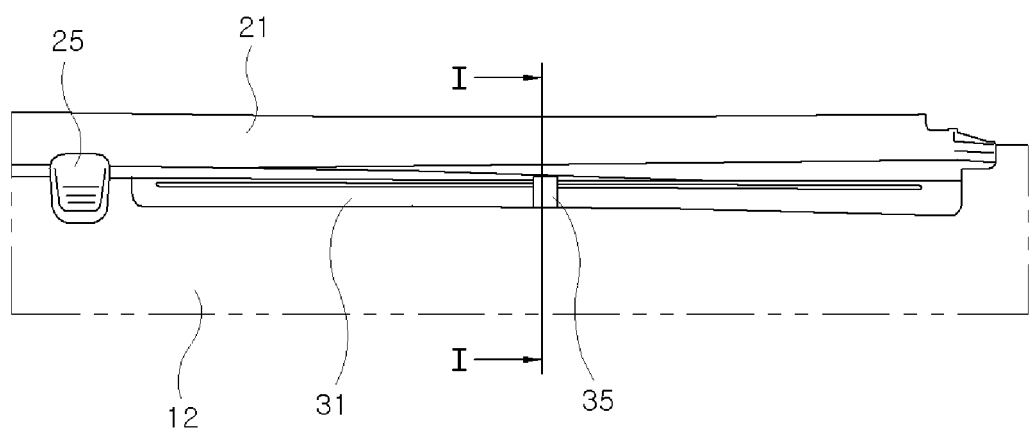
FIG. 4 is a plan view illustrating Portion B of FIG. 2 when viewed from the top according to an exemplary embodiment of the present disclosure.
Figure 5:
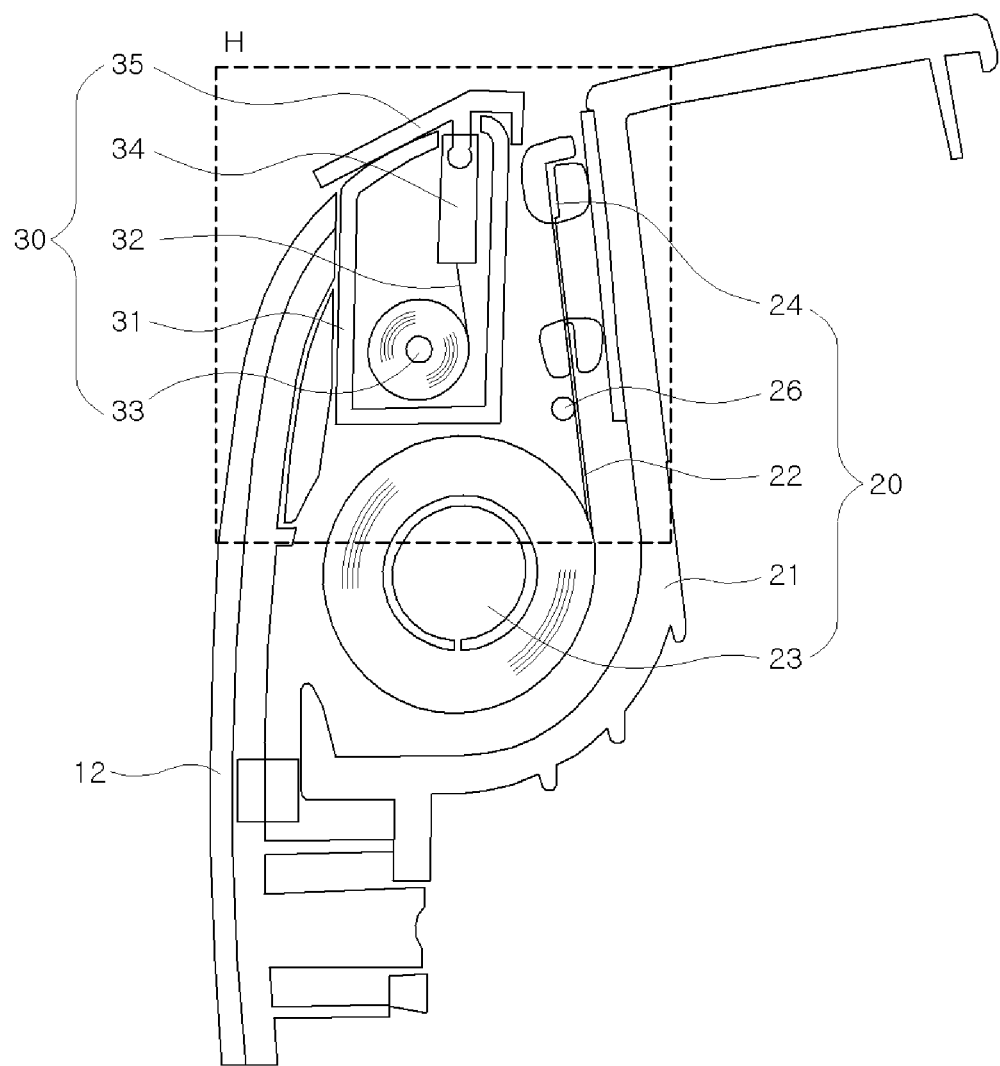
FIG. 5 is a cross-sectional view taken along line I-I of FIG. 4 according to an exemplary embodiment of the present disclosure.
Figure 6:
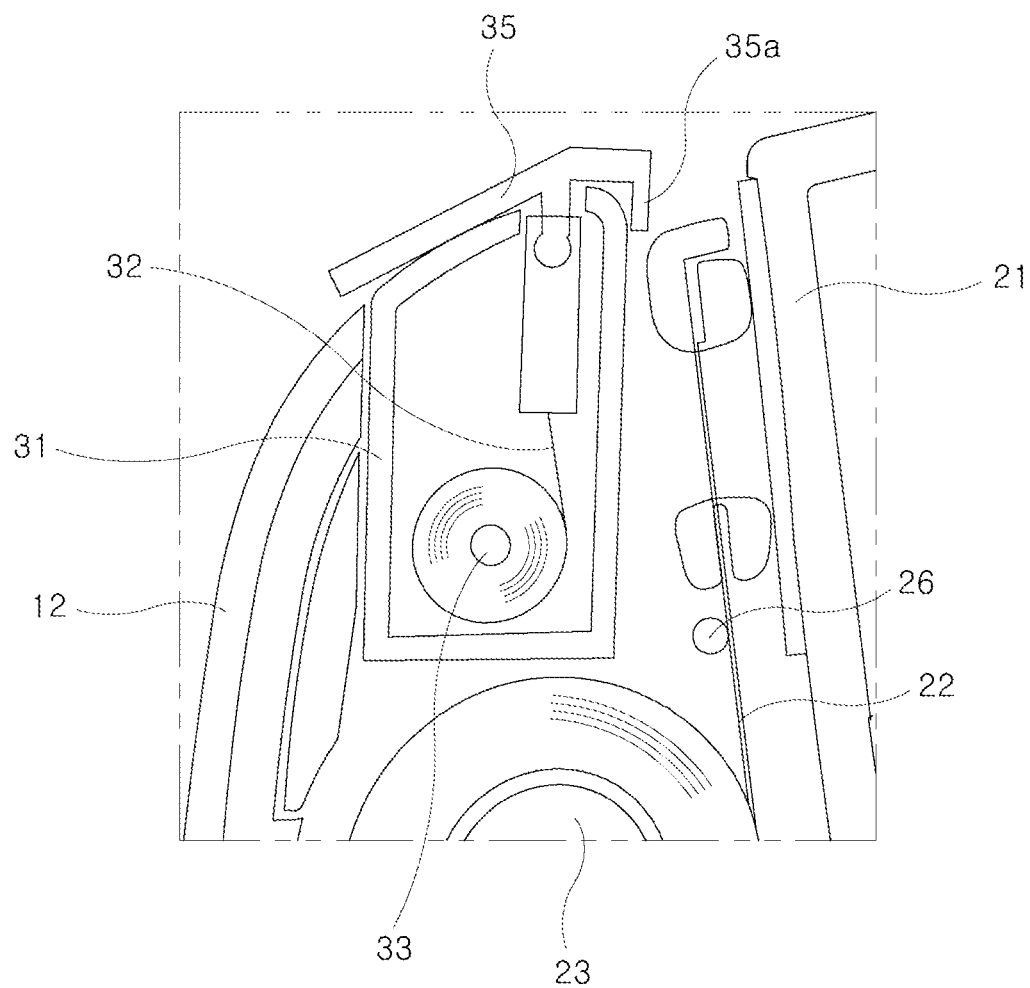
FIG. 6 is an enlarged cross-sectional view illustrating Portion H of FIG. 5 according to an exemplary embodiment of the present disclosure.
Figure 14:
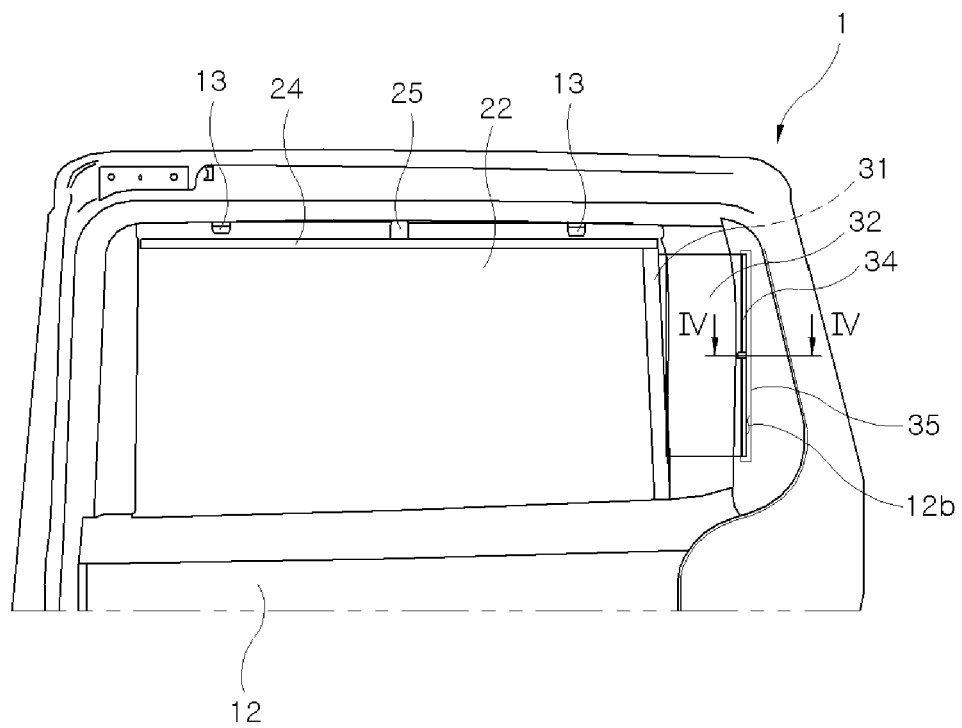
FIG. 14 is a schematic view illustrating a state in which a main curtain part and a sub-curtain part are deployed in the door curtain assembly having a sub-curtain according to an exemplary embodiment of the present disclosure.

In the sub-curtain part 30, the main fabric 22 may be deployed from the main curtain part 20 and then the sub-fabric 32 of the sub-curtain part 30 may be additionally deployed to occlude a region which is not occluded by the main fabric 22. (see FIGS. 2 and 14). The sub-curtain part 30 may include the rotating sub-housing 31 interlocked with ascending or descending of the main fabric 22, the sub-fabric 32 wound in the sub-housing 31, the sub-shade bar 34 installed in the end portion of the sub-fabric 32, and a sub-knob 35 configured to be used to deploy or accommodate the sub-fabric 32.

Figure 9:
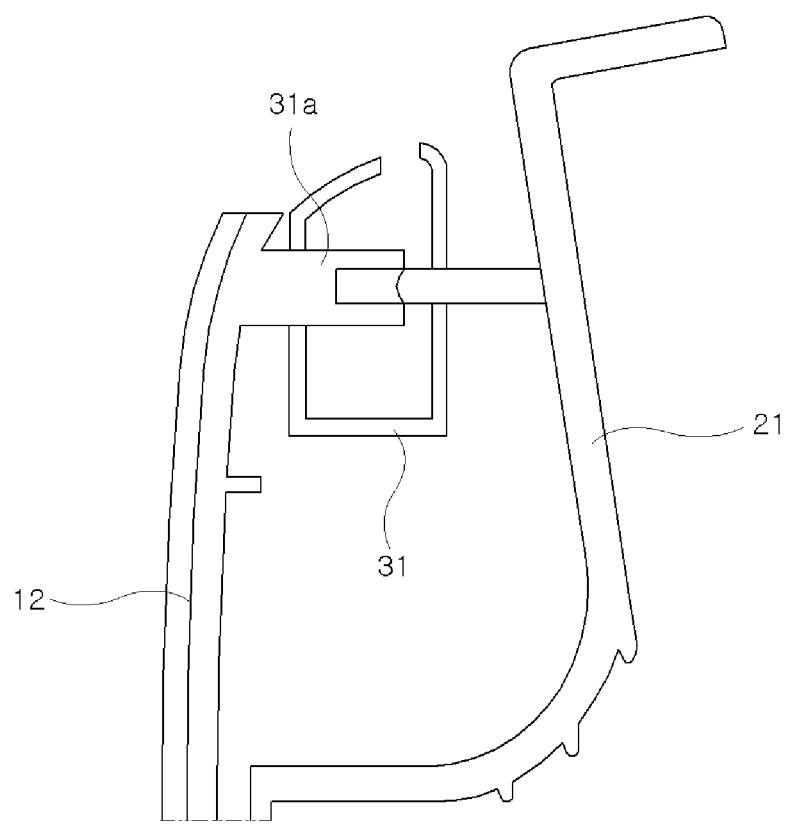
FIG. 9 is a cross-sectional view taken along line II-II of FIG. 8 according to an exemplary embodiment of the present disclosure.

A first side of the sub-housing 31, for example, a rear end portion which is an end portion adjacent to a rear side of the vehicle, may be hinge-coupled to one side of the door 1, and a second side of the sub-housing 31 may be interlocked with the ascending or descending of the main shade bar 24. The rear end portion of the sub-housing 31 may be hinge-coupled to a rotating shaft 31a that protrudes from either the trim 12 or the main housing 21. For example, the rear end portion of the sub-housing 31 may be hinge-coupled to a rotating shaft protruding from the trim 12 or hinge-coupled to a rotating shaft that protrudes from the main housing 21. Alternatively, as shown in FIG. 9, portions that protrude from the trim 12 and the main housing 21 may be coupled to each other to become the rotating shaft 31a passing through the rear end portion of the sub-housing 31.

Figure 7:
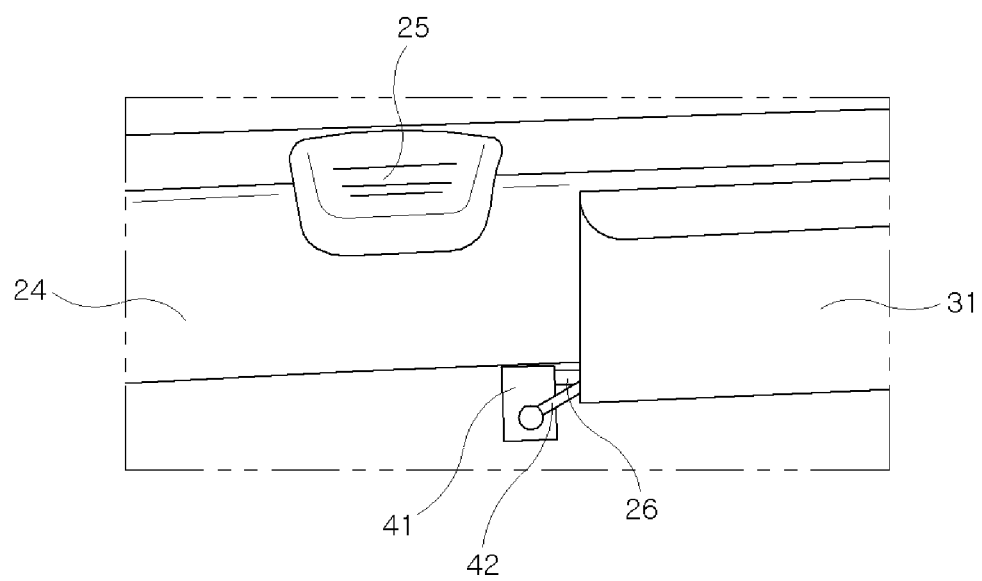
FIG. 7 is an enlarged view illustrating Portion D of FIG. 3 according to an exemplary embodiment of the present disclosure.
Figure 8:
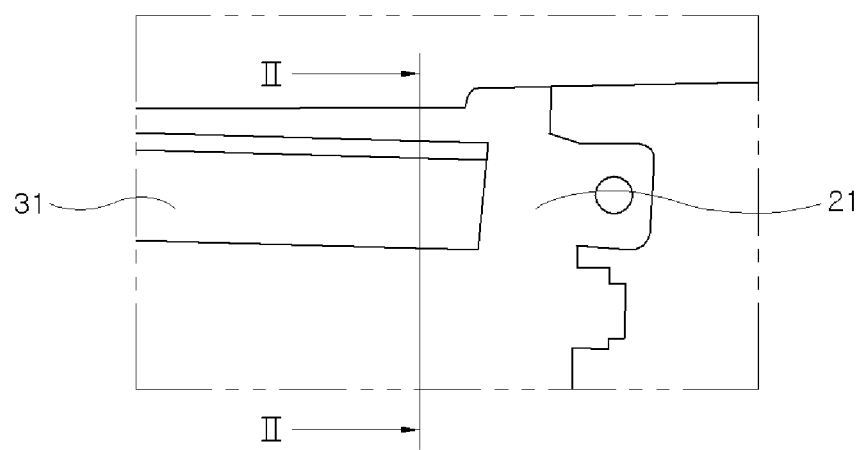
FIG. 8 is an enlarged view illustrating Portion E of FIG. 3 according to an exemplary embodiment of the present disclosure.
Figure 10:
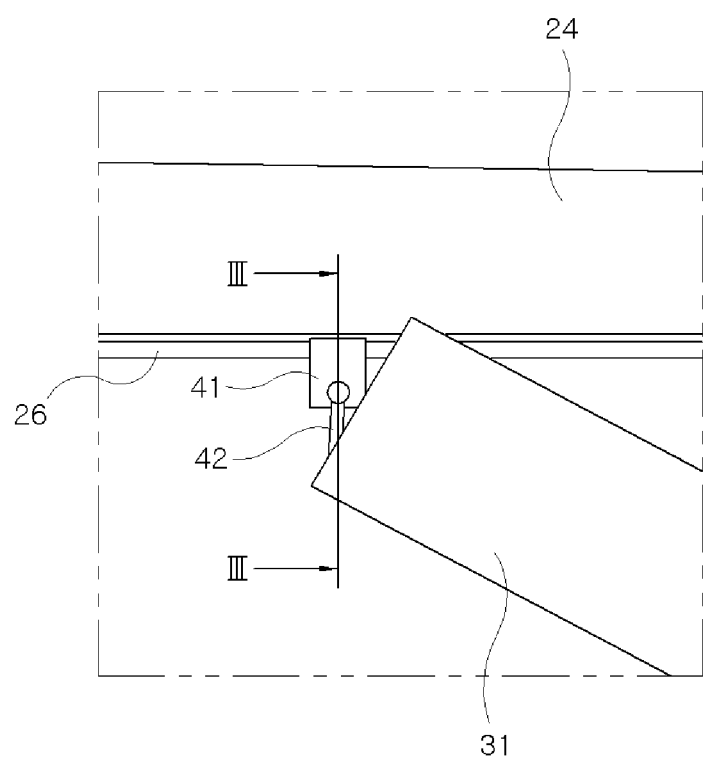
FIG. 10 is an enlarged view illustrating Portion F of FIG. 3 according to an exemplary embodiment of the present disclosure.
Figure 11:
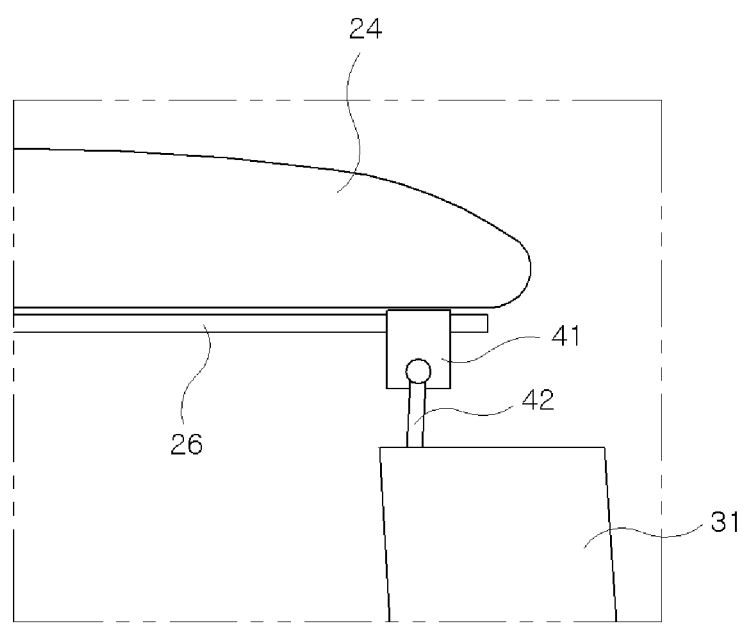
FIG. 11 is an enlarged view illustrating Portion G of FIG. 3 according to an exemplary embodiment of the present disclosure.

A front end of the sub-housing 31 may be interlocked with the ascending or descending of the main shade bar 24 (see FIGS. 7, 10, and 11). In other words, as the main shade bar 24 ascends, the sub-housing 31 approaches erection or stands upright from a horizontal state. Since a rear end of the sub-housing 31 is restricted to the rotating shaft 31a, the front end of the sub-housing 31 slides in a length direction of the main shade bar 24 to be interlocked such that the horizontal state becomes a vertical state.

A structure in which the front end of the sub-housing 31 is interlocked with the main shade bar 24 will be described below. A rail 26 that guides the interlocking of the sub-housing 31 may be disposed below the main shade bar 24 and parallel thereto. The rail 26 may extend from a rear end of the main shade bar 24 to a predetermined length in the length direction of the main shade bar 24. The rail 26 may be formed to a predetermined length from the rear end of the main shade bar 24. In particular, a front end of the rail 26 may be disposed behind the vehicle than the main knob 25 since the sub-curtain part 30 does not interfere with an operation of the main knob 25.

Figure 12:
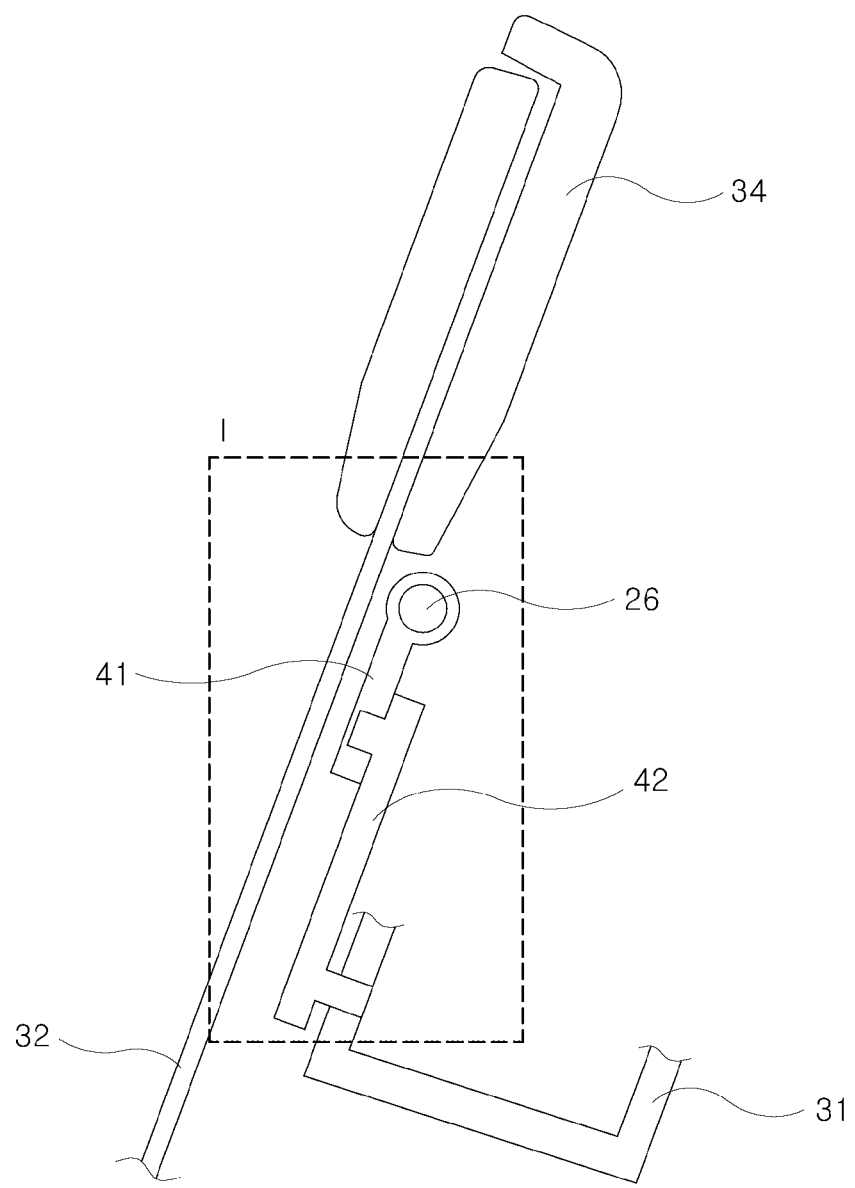
FIG. 12 is a cross-sectional view taken along line III-III of FIG. 11 according to an exemplary embodiment of the present disclosure.
Figure 13:
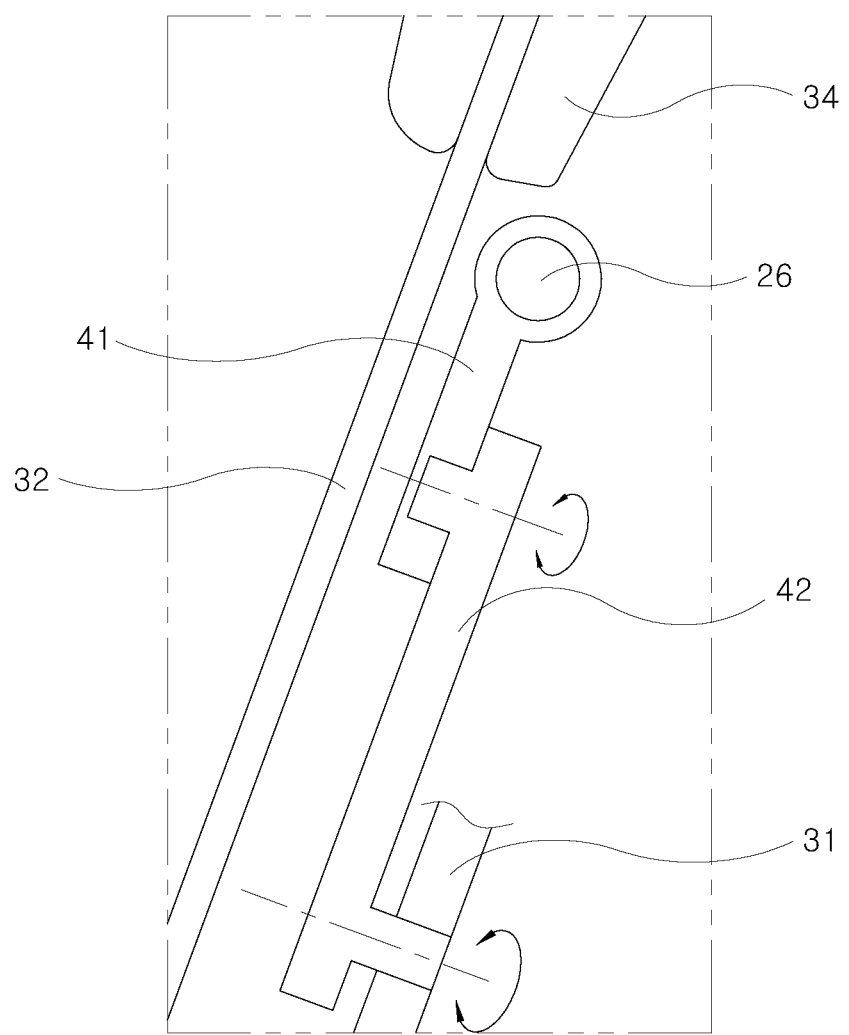
FIG. 13 is an enlarged cross-sectional view illustrating Portion I of FIG. 12 according to an exemplary embodiment of the present disclosure.

A sliding block 41 for sliding along the rail 26 may be installed in the rail 26. Both ends of the rail 26 may be fixed to the main shade bar 24. Since the sliding block 41 is connected to the front end of the sub-housing 31, a connection link 42 may be provided to connect the rail 26 to the front end of the sub-housing 31. Both ends of the connection link 42 may be hinge-coupled to the sliding block 41 and the sub-housing 31 (see FIGS. 12 and 13) and thus, a portion in which the connection link 42 is hinge-coupled to the sliding block 41 and a portion in which the connection link 42 is hinge-coupled to the sub-housing 31 may be hinge-coupled. Accordingly, the front end of the sub-housing 31 may be interlocked with the ascending or descending of the main shade bar 24.

The sub-fabric 32 may be wound in the sub-housing 31. Similar to the main fabric 22, the sub-fabric 32 may be wound around a sub-shaft 33 installed in the sub-housing 31. Since the sub-shaft 33 may be elastically supported in a direction of winding the sub-fabric 32 due to a spring or the like, the sub-fabric 32 may be continuously elastically supported in a direction of being wound around the sub-shaft 33. The sub-shade bar 34 may be installed in the end portion of the sub-fabric 32 (e.g., an end portion in a direction of being drawn out) and thus the end portion of the sub-fabric 32 has rigidity and thus, the end portion of the sub-fabric 32 may be simultaneously drawn out or accommodated.

Figure 15:
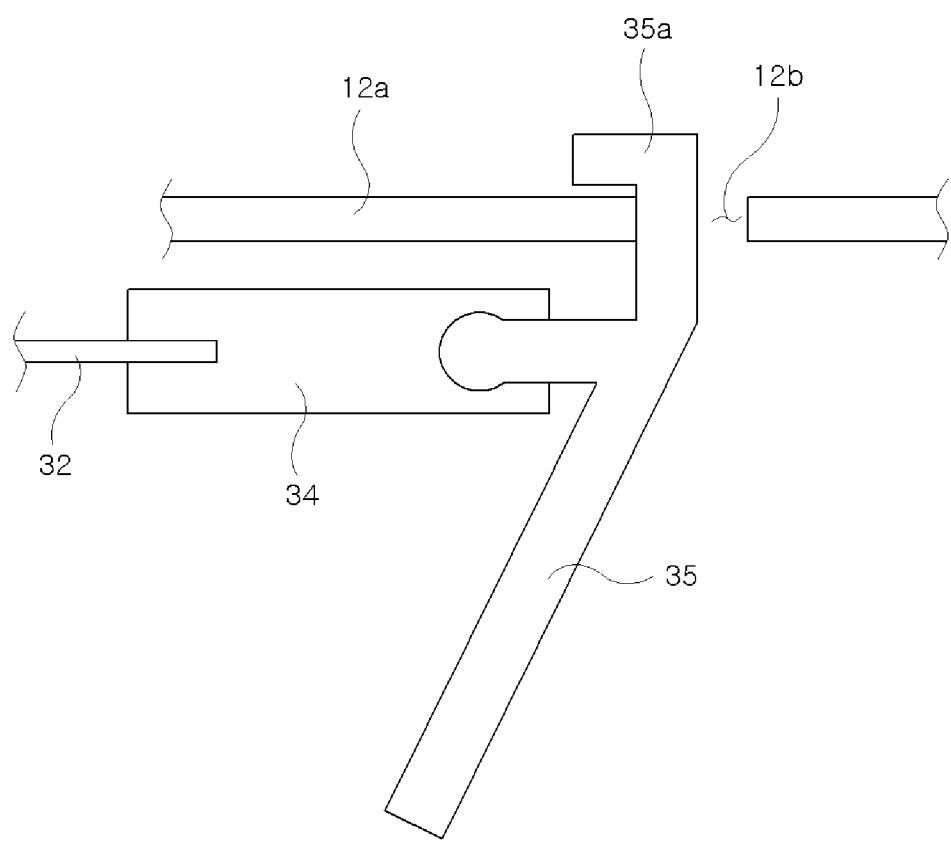
FIG. 15 is a cross-sectional view taken along line IV-IV of FIG. 14 according to an exemplary embodiment of the present disclosure.

The sub-knob 35 may be disposed at one side of the sub-shade bar 34 and is used when the user secondly deploys the sub-fabric 32 after the main curtain part 20 is deployed. The sub-knob 35 may be installed at an intermediate position of the sub-shade bar 34. A catch part 35a may be formed in the sub-knob 35, and when the sub-fabric 32 is deployed, the catch part 35a may pass through a slit 12b formed at one side of the trim 12 to be caught to a fixing part 12a of the trim 12 (see FIG. 15). When the sub-fabric 32 is accommodated in the sub-housing 31, the catch part 35a may be caught to the sub-housing 31 to prevent the sub-shade bar 34 from being inserted into the sub-housing 31.

Since the sub-curtain part 30 may be additionally developed after the main curtain part 20 is deployed, the sub-curtain part 30 may be disposed further inward to the interior of the vehicle than the main curtain part 20. In other words, since the sub-housing 31 may be disposed further inward to the interior of the vehicle than the main fabric 22 in an interior of the main housing 21 in which the main fabric 22 is accommodated, the sub-curtain part 30 may be additionally deployed after the main curtain part 20 is deployed.

In accordance with a door curtain assembly having a sub-curtain according to the present disclosure and the above-described configuration, a sub-curtain may be additionally deployed to a region which is not occluded or blocked by a main curtain thus blocking an entirety of a glass of a door by the main curtain and the sub-curtain. Since the glass of the door may be blocked by the main curtain and the sub-curtain, it may be possible to control lighting to a desired state of an occupant and prevent exposure of an interior of a vehicle.

While the present disclosure has been described with respect to the specific embodiments, it will be apparent to those skilled in the art that various changes and modifications may be made without departing from the spirit and scope of the present disclosure as defined in the following claims. Accordingly, it should be noted that such alternations or modifications fall within the claims of the present disclosure, and the scope of the present disclosure should be construed based on the appended claims.

What is claimed is:

1. A door curtain assembly having a sub-curtain part, comprising:
   a main fabric wound in a trim of a vehicle door;
   a main shade bar installed in an upper end of the main fabric and fixed to a hook provided in the door when the main fabric is deployed; and
   a sub-curtain part configured to be additionally deployed after the main curtain part is deployed,
   wherein the sub-curtain part includes:
      a sub-housing having a first side hinge-coupled to the door, and a second side interlocked with ascending or descending of the main shade bar;
      a sub-fabric wound in the sub-housing; and
      a sub-shade bar installed in an end portion of the sub-fabric in a length direction of the sub-housing.

2. The door curtain assembly of claim 1, further comprising:
   a rail disposed below and parallel to the main shade bar and configured to integrally ascend or descend with the main shade bar; and
   a sliding block slidably installed in the rail,
   wherein a front end of the sub-housing is connected to the sliding block to interlock the sub-housing with the ascending or descending of the main shade bar.

3. The door curtain assembly of claim 2, wherein: the sliding block is connected to the front end of the sub-housing through a connection link; and both ends of the connection link are hinge-coupled to the sliding block and the sub-housing, respectively.

4. The door curtain assembly of claim 1, wherein said first side of the sub-housing is hinge coupled to a rotating shaft that protrudes from either the trim or a main housing in which the main fabric is accommodated, so that the sub-housing is hinge-coupled to the door.

5. The door curtain assembly of claim 2, wherein the rail is formed to a predetermined length from one side of the main shade bar.

6. The door curtain assembly of claim 5, wherein a front end of the rail is disposed behind a main knob installed in the main shade bar for the ascending or descending operation of the main shade bar.

7. The door curtain assembly of claim 1, wherein the sub-fabric is elastically supported to be wound in the sub-housing.

8. The door curtain assembly of claim 1, wherein a sub-knob is disposed at one side of the sub-shade bar and operated when the sub-fabric is deployed.

9. The door curtain assembly of claim 8, wherein a catch part is formed in the sub-knob and is fixed and caught on the trim of the door when the sub-fabric is deployed.

10. The door curtain assembly of claim 9, wherein a slit on which the catch part passes to be caught when the sub-fabric is deployed is formed in the trim.

11. The door curtain assembly of claim 8, wherein a hook to which the sub-shade bar is caught and fixed is installed in the trim.

12. The door curtain assembly of claim 1, wherein the sub-curtain part is disposed further inward to an interior of a vehicle than the main fabric.

13. The door curtain assembly of claim 12, wherein the sub-housing is disposed further inward to the interior of the vehicle than the main fabric in the main housing in which the main fabric is accommodated.

14. The door curtain assembly of claim 1, wherein the sub-curtain part is deployed to a rear side of a vehicle.

* * * * *